US009396759B2

(12) United States Patent
Johansson et al.

(10) Patent No.: US 9,396,759 B2
(45) Date of Patent: *Jul. 19, 2016

(54) GENERATING CONTENT DATA FOR A VIDEO FILE

(71) Applicants: Sony Corporation, Tokyo (JP); Sony Mobile Communications AB, Lund (SE)

(72) Inventors: Fredrik Johansson, Malmö (SE); Olle Håff, Umeå (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,145

(22) Filed: Nov. 3, 2014

(65) Prior Publication Data
US 2015/0050008 A1 Feb. 19, 2015

Related U.S. Application Data

(63) Continuation of application No. 13/470,992, filed on May 14, 2012, now Pat. No. 8,879,892.

(60) Provisional application No. 61/488,951, filed on May 23, 2011.

(30) Foreign Application Priority Data

May 23, 2011 (EP) .................... 11004251

(51) Int. Cl.
G11B 27/10 (2006.01)
G06F 17/30 (2006.01)
G06K 9/00 (2006.01)

(52) U.S. Cl.
CPC .......... *G11B 27/10* (2013.01); *G06F 17/30781* (2013.01); *G06F 17/30793* (2013.01); *G06K 9/00268* (2013.01)

(58) Field of Classification Search
None
See application file for complete search history.

(56) References Cited

U.S. PATENT DOCUMENTS

| 8,879,892 | B2 * | 11/2014 | Johansson et al. ............ 386/248 |
| 2004/0095396 | A1 | 5/2004 | Stavely et al. |
| 2007/0294295 | A1 * | 12/2007 | Finkelstein ....... G06F 17/30017 |
| 2009/0310021 | A1 | 12/2009 | Kondo et al. |
| 2011/0235992 | A1 * | 9/2011 | Mihara .................. H04N 5/775 386/239 |
| 2014/0036109 | A1 * | 2/2014 | Steinberg ........... G06K 9/00228 348/234 |

FOREIGN PATENT DOCUMENTS

WO 2007052149 5/2007

OTHER PUBLICATIONS

Smith et al., "Video Skimming for Quick Browsing based on Audio and Image Characterization", Internet Citation, XP002470969 (Jul. 30, 1995).
Lienhart et al., "Video Abstracting", Communications of the Association for Computing Machinery, vol. 40, No. 12, pp. 55-62 (1997).

* cited by examiner

*Primary Examiner* — Eileen Adams
(74) *Attorney, Agent, or Firm* — Wolf, Greenfield & Sacks, P.C.

(57) ABSTRACT

A method for generating content data for a video file (200) is provided. The video file (200) comprises a video sequence and the content data (201) for characterizing the video sequence. According to the method, at least one face containing image (204, 205, 207, 209, 212) is determined by scanning at least a part of the video sequence for face containing images. Each face containing image contains at least one representation of a face. Based on the determined face containing image a picture containing the face is generated and assigned to the content data (201) of the video file (200).

11 Claims, 3 Drawing Sheets

GENERATING CONTENT DATA FOR A VIDEO FILE

CROSS-REFERENCE TO RELATED APPLICATIONS

This application is a continuation of copending application U.S. Ser. No. 13/470,992, filed on May 14, 2012, which claims under 35 U.S.C. §119(e) the benefit of U.S. Provisional Application No. 61/488,951, filed May 23, 2011, and claims under 35 U.S.C. §119(a) the benefit of European Application No. 11 004 251.2, filed May 23, 2011, the entire contents of which are incorporated herein by reference.

FIELD OF THE INVENTION

The present application relates to a method for generating content data for a video file and a device utilizing the method.

BACKGROUND OF THE INVENTION

In consumer products, especially mobile devices like for example mobile phones, personal digital assistants, mobile music players or mobile video players, the amount of memory for storing data increases continuously and therefore the number of files containing music, images and videos which can be stored in the memory of the device increases rapidly. For managing these files graphical user interfaces are used. Having an attractive graphical user interface which can provide information about the files intuitively to the user is key in creation of consumer products. For example, for searching images stored on the device previews are provided as so called thumbnails on the graphical user interface. For videos which can be downloaded from premium services the corresponding video files contain a content data section in which a thumbnail picture may be provided which can be displayed to the user as a content preview. However, videos which are recorded by the user or which do not provide a thumbnail picture as content data, no appropriate content data can be displayed to the user when the user is browsing through a plurality of video files.

Therefore, there is a need for automatically providing content data for a video file.

SUMMARY OF THE INVENTION

According to an aspect of the present invention, a method for generating content data for a video file is provided. The video file comprises a video sequence and the content data for characterizing the video sequence. The content data may comprise for example a length of the video sequence, a resolution of the video sequence, a time and date information when the video sequence was recorded and so on. Furthermore, the content data may comprise an area for storing picture data which may be displayed to a user as a preview thumbnail picture. Therefore, the content data comprises so called meta data or tag information characterizing the video sequence. According to the method, at least one face containing image is determined by scanning at least a part of the video sequence for face containing images. Each face containing image contains at least one representation of a face, for example a human face in a front or side view, or a face of an animal. Based on the determined at least one face containing image at least one picture containing the face is generated. The at least one picture is assigned to the content data of the video file. Therefore, by automatically searching for face containing images in the video file and assigning a picture containing the face to the content data, a preview information can be provided to the user, for example as a thumbnail, which is relevant and informative. The method may be applied to any kind of video sequence, especially to video sequences which have been recorded by the user.

According to an embodiment, a subset of face containing images is selected from the at least one face containing image and a picture sequence is generated based on the subset of face containing images. The pictures sequence is assigned to the content data of the video file. For example, the pictures sequence may comprise five pictures showing faces from different scenes of the video sequence and these five pictures are assigned to the content data of the video file. When the video file is shown as an icon in an explorer of a graphical user interface, the icon may comprise an area for showing the five thumbnail pictures. For example, the five thumbnail pictures may be displayed at the same time one beside each other in the icon, or the five thumbnail pictures may be displayed one after the other in the icon of the video file. When the thumbnail pictures are displayed in succession, each thumbnail picture may be displayed for one second before the next one is displayed and starting again with the first one after the last one has been displayed.

According to another embodiment, the at least one picture is cropped by removing an area of the picture which does not contain the representation of the face. By cropping the pictures to be displayed as thumbnail pictures, non-relevant information may be removed from the picture. Furthermore, as the thumbnail pictures are usually rather small, a size of the face in the thumbnail picture may be increased.

According to another embodiment, for generating the at least one picture a percentage area covered by the representation of the face is determined for each face containing image and the at least one picture is generated based on the determined at least one face containing image and on the corresponding percentage area. The video sequence may comprise a lot of face containing images. In some images the faces may be very small and may cover only a very small area of the face containing image. Other face containing images may mainly represent one face and may therefore be covered mainly by the representation of the face. By selecting those face containing images in which the representation of the face covers a large area, a representative face containing image may be selected for generating the thumbnail picture.

According to another embodiment, the at least one picture may be generated based on a face containing image which represents the largest number of faces. Depending on the content of the video sequence, a picture representing a large group of people may be characterizing for the video sequence and may thus advantageously selected as the picture for the content data.

Furthermore, the at least one picture may be generated based on a first determined face containing image in the video sequence. This may reduce the computing power needed to scan the video sequence for the face containing images. The at least one picture may comprise only one picture which is stored in the content data of the video file.

According to an embodiment, a resolution of each picture of the at least one picture is reduced to a resolution which is lower than a resolution of the corresponding face containing image. As the at least one picture may be used as a thumbnail picture of an icon on a display of a mobile device for a user, the resolution of the thumbnail picture may be lower than the resolution of the face containing image of the video sequence without degrading a quality of the displayed picture in the icon. Therefore, memory for storing the picture as the content data of the video file may be saved.

According to another embodiment, for generating the at least one picture one face containing image of the at least one face containing image is selected and based on the face containing image a video subsequence of a predetermined length is selected from the video sequence. The video subsequence contains the selected face containing image. The video subsequence is assigned to the content data of the video file. Therefore, when the video file is displayed as an icon on the display to a user, the thumbnail information of the icon may comprise the video subsequence of the predetermined length which may be repeatedly displayed as a thumbnail video in the icon. This may provide a very attractive and informative representation of the video file when the user is browsing the files stored on the mobile device.

According to another embodiment, the video sequence comprises a plurality of sequential image frames and the at least one face containing image is determined by scanning at least a subset of the plurality of sequential image frames for face containing image frames. Scanning image frames for face containing image frames can be conducted with a face detecting engine which may be realized as a software and/or hardware. Furthermore, the subset of the plurality of sequential image frames may comprise only every n-th image frame of the plurality of sequential image frames. The value for n may be determined based on a total length of the video sequence or may be a predetermined value in a range of one to 500. Thus, the number of image frames to be scanned may be reduced which may reduce the required computing performance and may speed up the method.

According to another embodiment, the subset of the plurality of sequential image frames may comprise image frames within a predetermined time interval of the video sequence only. For example, depending on the content of the video sequence, the image frames to be scanned may be selected from a time interval of the first half of the video sequence only. For example, when the video sequence comprises a detective story, image frames from the beginning of the video sequence may be selected only to avoid showing images of the end of the story.

According to a further embodiment, the step of determining at least one face containing image comprises scanning the video sequence for a face or face containing information, wherein a corresponding thumbnail representation including the face is assigned to the video file.

According to another aspect of the present invention, a device comprising a video access unit, a face detection unit and a processing unit is provided. The video access unit is adapted to access a video file. The video file comprises a video sequence and content data for characterizing the video sequence. The face detection unit is coupled to the video access unit. The face detection unit is configured to determine at least one face containing image by scanning at least a part of the video sequence for face containing images. Each face containing image contains at least one representation of a face, for example a human face. The processing unit is coupled to the face detection unit and configured to generate at least one picture containing the face based on the determined at least one face containing image. The processing unit is furthermore adapted to assign the at least one picture to the content data of the video file.

The device may be adapted to perform the above-described methods and comprises therefore the above-described advantages.

The device may comprise for example a mobile phone, a personal digital assistant, a personal computer, a portable personal computer, or a mobile video player.

Although specific features described in the above summary and the following detailed description are described in connection with specific embodiments, it is to be understood that the features of the embodiment can be combined with each other unless specifically noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

It is to be understood that the features of the various exemplary embodiments described herein may be combined with each other unless specifically noted otherwise.

Figure 1:
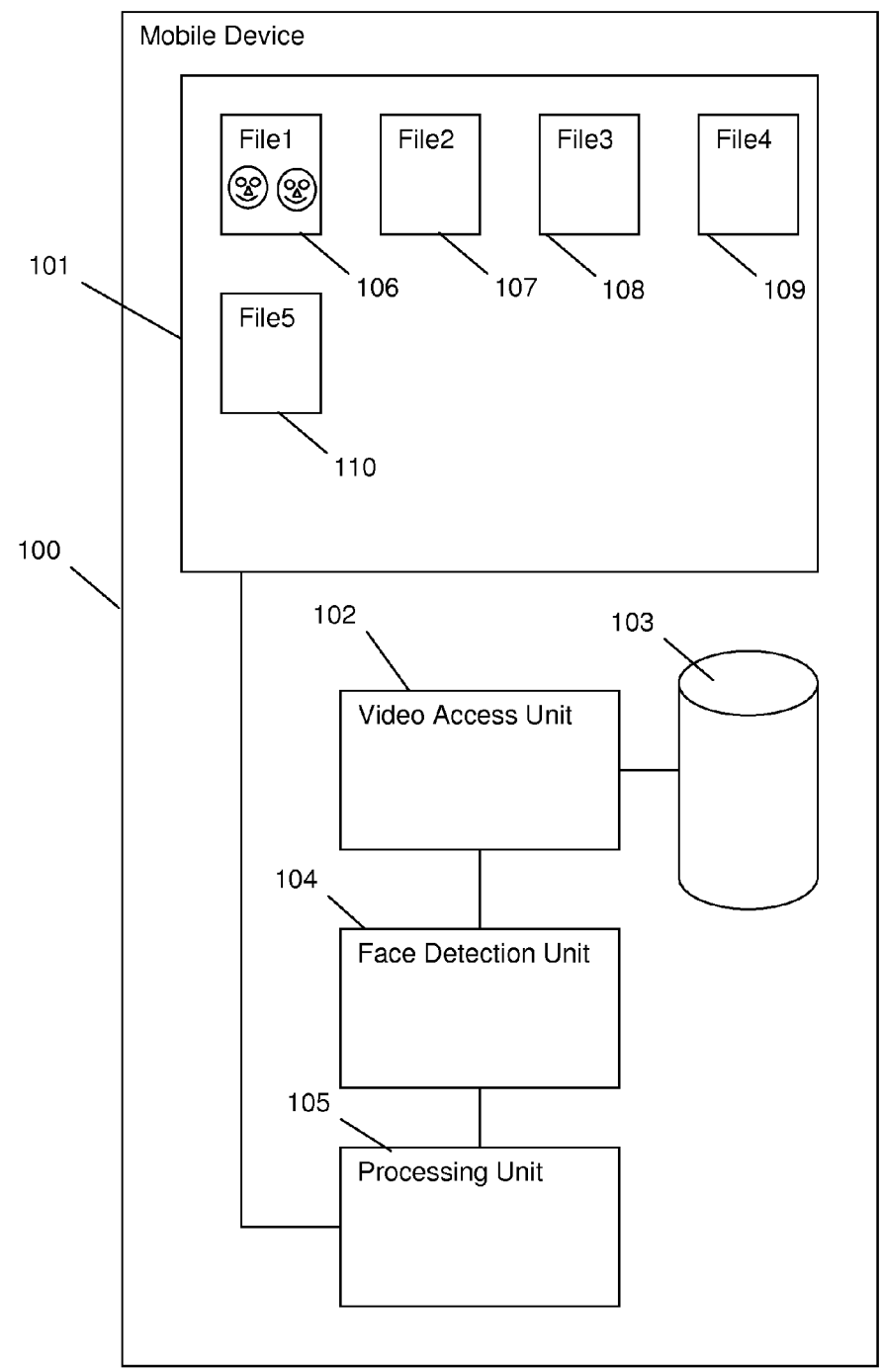
FIG. 1 shows a mobile device according to an embodiment of the present invention.

FIG. 1 schematically shows a mobile device 100, for example a mobile phone. The mobile device 100 comprises a display 101, a video access unit 102, a memory 103, a face detection unit 104, and a processing unit 105. The mobile device 100 may comprise a lot more components, for example a microphone, a loudspeaker, a keypad, a transceiver for communicating via a cellular network and so on. However, these additional components are not shown for clarity reasons. The display 101 may comprise a graphical display which may be adapted to display colored information of a graphical user interface. Graphical user interfaces are known in the art and will therefore not be described in more detail herein. The processing unit 105 may be adapted to control the display 101 in various applications. One application may comprise for example an explorer view listing files which are stored in the memory 103. As shown in FIG. 1, each file may be displayed as an icon 106-110. Each icon may comprise the name of the file, for example "File1" to "File5" as shown in FIG. 1. In each icon 106-110 additionally a graphical information may be displayed for characterizing the corresponding file in more detail. For example, a picture may be displayed within the icon 106-110. The picture to be displayed in the icon, for example in icon 106, may be stored in the corresponding file in the memory 103 as a so called content data.

Figure 2:
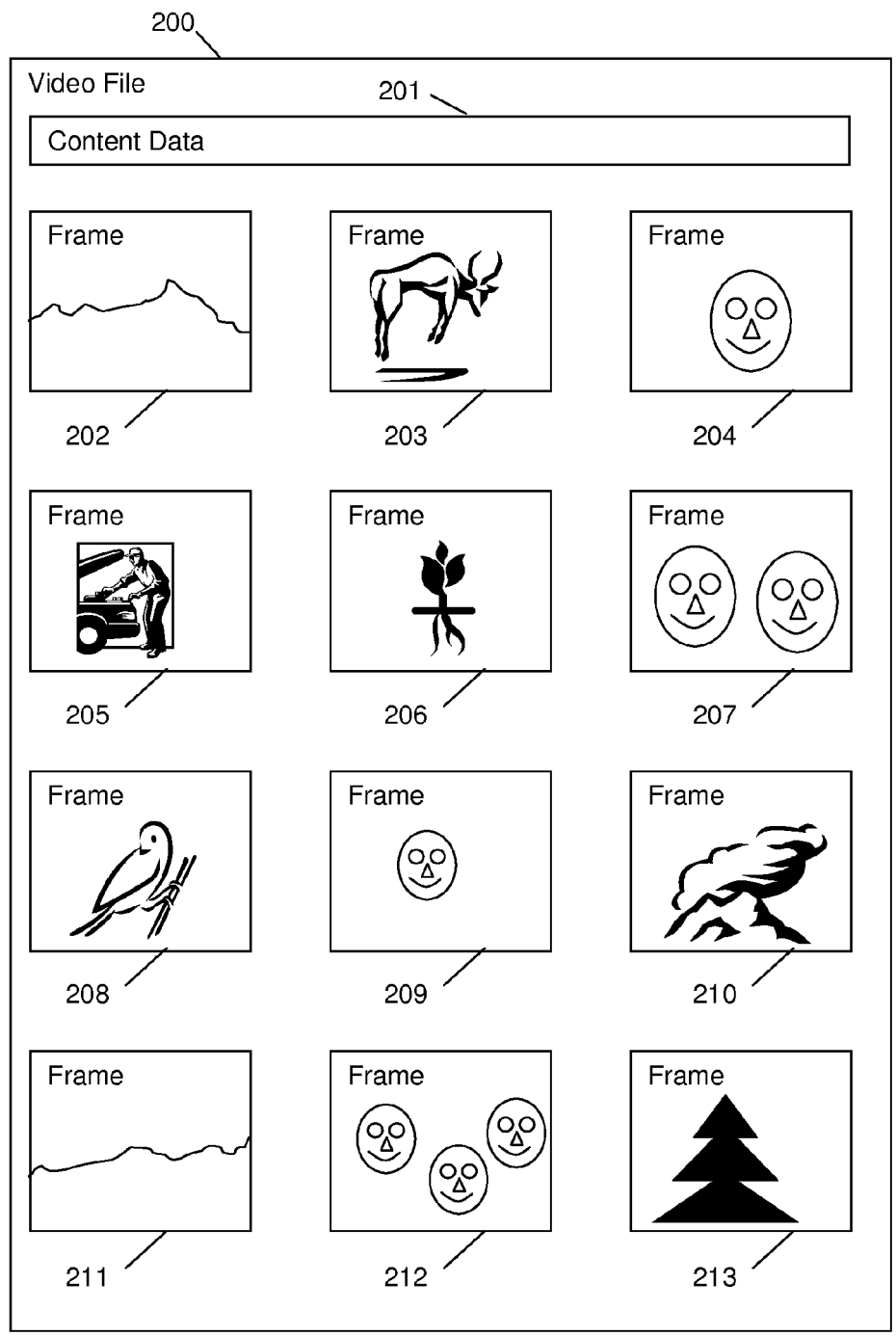
FIG. 2 shows a schematic view of a video file.

FIG. 2 shows schematically a structure of a video file 200 which may be stored as a file in the memory 103. The video file 200 contains content data 201 and a plurality of frames 202-213. The content data 201 may comprise so called meta data or tag data characterizing the video file 200. The content data 201 may comprise for example a title of the video file, a time and date information when the video file was taken, a length of the video file, a resolution of the frames of the video file and so on. Additionally, the content data 201 may comprise an area for storing a picture which may be displayed as a so called thumbnail picture when the video file 200 is listed on a display 101 as shown in FIG. 1. Each frame of the plurality of frames 202 and 213 comprises image information which may be displayed as a video sequence when the video file 200 is played back. The exemplary video file 200 shown in FIG. 2 may comprise much more frames than the shown frames 202-213. More precisely, the exemplary frames 202-213 show only an exemplary subset of frames of the video file 200 and between each two of the frames 202-213 a lot more frames may be arranged.

Figure 3:
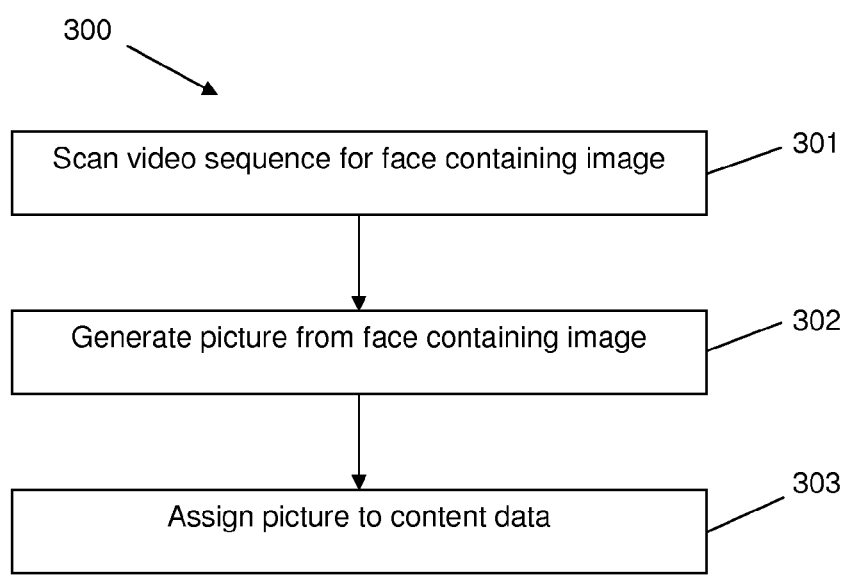
FIG. 3 shows a flow chart with steps of a method according to an embodiment of the present invention.

In the following, in connection with FIG. 3, generating a picture for the content data 201 will be described in more detail. The video access unit 102 accesses the memory 103 on which the video file 200 is stored. Data of the video file 200 is passed to the face detection unit 104 which scans in step 301 of flow chart 300 the video sequence of the video file 200 fame by frame for face containing images. In the exemplary video file 200 the face detection unit 104 may detect for example frames 204, 205, 207, 209, and 212 as face containing images. These face containing images may be passed to the processing unit 105 which may select one of the frames 204, 205, 207, 209 and 212 for generating a thumbnail picture. For example, the processing unit 105 may select frame 207 as in frame 207 the largest area of the frame is covered with face information compared to the other face containing frames 204, 205, 209 and 212. Therefore, in step 302 the processing unit 105 generates the thumbnail picture from frame 207. Furthermore, the processing unit may for example crop the generated picture such that the picture mainly shows only the faces of frame 207. Next, in step 303, the processing unit 105 assigns the thumbnail picture to the content data 201 of the video file 200. The new content data may be stored via the video access unit 102 in the memory 103. When the video file 200 is for example listed on the display 101 as File1 referenced by reference sign 106 in FIG. 1, the content data 201 showing two faces may be displayed as a thumbnail picture within the icon 106.

To get other results for the thumbnail picture, different algorithms can be used. For example, a frame containing the most identified faces may be used as the thumbnail picture or only frames shall be considered where at least a predetermined area of the frame is covered with faces, for example is covered at least 30% with faces. For longer video files algorithms that limit the number of frames to be scanned can be applied to minimize time to process and to save battery usage. For example, every 100th frame may be scanned only, to speed up the process and save battery.

While exemplary embodiments have been described above, various modifications may be implemented in other embodiments. For example, a plurality of thumbnail pictures may be assigned to the content data 201 and when listing the video file 200, the plurality of thumbnail pictures may be displayed consecutively in icon 106, for example one picture per second. Furthermore, a short video sequence around a frame containing image may be selected as the thumbnail picture and assigned to the content data 201. When displaying the icon 106, this short video sequence may be shown as a thumbnail video in the icon 106.

Finally, it is to be understood that all the embodiments described above are considered to be comprised by the present invention as it is defined by the appended claims.

The invention claimed is:

1. A method for generating content data for a video file, the video file comprising a video sequence and the content data for characterizing the video sequence, wherein the method comprises the steps of:
   determining at least one face containing image by scanning at least a part of the video sequence for face containing images, each face containing image containing at least one representation of a face;
   generating at least one picture containing the face based on the determined at least one face containing image; and
   assigning the at least one picture to the content data of the video file,
   wherein the step of generating at least one picture comprises:
   determining for each face containing image a percentage area covered by the representation of the face, the percentage area indicating a relative amount of area of the image covered by the representation of the face as compared to an entire area of the image;
   generating the at least one picture based on the determined at least one face containing image and on the corresponding percentage area;
   selecting one face containing image of the at least one face containing image; and
   selecting a video subsequence of a predetermined length from the video sequence as the at least one picture, the video subsequence containing the selected face containing image.

2. The method according to claim 1, wherein the steps of generating and assigning the at least one picture comprise:
   selecting a subset of face containing images from the at least one face containing image,
   generating a picture sequence based on the subset of face containing images, and
   assigning the picture sequence to the content data of the video file.

3. The method according to claim 1, wherein the method further comprises the step of:
   cropping the at least one picture by removing an area of the picture which does not contain the representation of the face.

4. The method according to claim 1, wherein the method further comprises the step of:
   reducing a resolution of each picture to a resolution which is lower than a resolution of the corresponding face containing image.

5. The method according to claim 1, wherein the method further comprises:
   displaying the at least one picture as a thumbnail of an icon on a display for a user.

6. The method of claim 1,
   wherein the step of generating at least one picture comprises:
   generating one picture based on a face containing image which represents the largest number of faces.

7. The method according to claim 1, wherein the video sequence comprises a plurality of sequential image frames, and wherein the step of determining at least one face containing image comprises:
   determining at least one face containing image by scanning at least a subset of the plurality of sequential image frames for face containing image frames.

8. The method according to claim 7, wherein the subset of the plurality of sequential image frames comprises every n-th image frame of the plurality of sequential image frames.

9. The method according to claim 7, wherein the subset of the plurality of sequential image frames comprises image frames of the plurality of sequential image frames within a predetermined time interval of the video sequence only.

10. A device comprising:
    a video access unit adapted to access a video file, the video file comprising a video sequence and content data for characterizing the video sequence;

a face detection unit coupled to the video access unit, the face detection unit being configured to determine at least one face containing image by scanning at least a part of the video sequence for face containing images, each face containing image containing at least one representation of a face; and a processing unit coupled to the face detection unit, the processing unit being configured to generate at least one picture containing the face based on the determined at least one face containing image, and to assign the at least one picture to the content data of the video file, wherein the processing unit is configured to determine for each face containing image a percentage area covered by the representation of the face, the percentage area indicating a relative amount of area of the image covered by the representation of the face as compared to an entire area of the image, to generate the at least one picture based on the determined at least one face containing image and on the corresponding percentage area, to select one face containing image of the at least one face containing image, and to select a video subsequence of a predetermined length from the video sequence as the at least one picture, the video subsequence containing the selected face containing image.

11. The device according to claim 10, wherein the device comprises at least one device of a group consisting of a mobile phone, a personal digital assistant, and a mobile video player.

* * * * *